(12) United States Patent
Yoshida

(10) Patent No.: US 10,042,239 B2
(45) Date of Patent: Aug. 7, 2018

(54) COOLING DEVICE AND PROJECTOR INCLUDING THE COOLING DEVICE

(71) Applicant: CASIO COMPUTER CO., LTD., Shibuya-ku, Tokyo (JP)

(72) Inventor: Naoto Yoshida, Kawasaki (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/460,648

(22) Filed: Mar. 16, 2017

(65) Prior Publication Data

US 2017/0363939 A1 Dec. 21, 2017

(30) Foreign Application Priority Data

Jun. 21, 2016 (JP) ................................. 2016-122424

(51) Int. Cl.
| | |
|---|---|
| *G03B 21/16* | (2006.01) |
| *F21V 29/74* | (2015.01) |
| *G02B 26/00* | (2006.01) |
| *G03B 21/20* | (2006.01) |

(52) U.S. Cl.
CPC .............. *G03B 21/16* (2013.01); *F21V 29/74* (2015.01); *G02B 26/008* (2013.01); *G03B 21/20* (2013.01)

(58) Field of Classification Search
CPC .. G03B 21/16; G03B 21/145; G03B 21/2013; G03B 21/2033; H04N 9/3141; H04N 9/3144; H04N 9/3161
See application file for complete search history.

(56) References Cited

U.S. PATENT DOCUMENTS

| | | | | |
|---|---|---|---|---|
| 2006/0197916 A1* | 9/2006 | Hashimoto | ............ | G03B 21/16 353/52 |
| 2007/0139887 A1* | 6/2007 | Lee | ........................ | G03B 21/16 361/700 |
| 2008/0055563 A1* | 3/2008 | Momose | ................ | G03B 21/16 353/61 |
| 2009/0153805 A1* | 6/2009 | Li | .......................... | G03B 21/16 353/57 |
| 2010/0245777 A1* | 9/2010 | Ogura | .................. | G02B 5/0215 353/38 |
| 2011/0157560 A1* | 6/2011 | Hsiao | ..................... | G03B 21/16 353/58 |

FOREIGN PATENT DOCUMENTS

JP 2015052791 A 3/2015

* cited by examiner

*Primary Examiner* — Sultan Chowdhury
(74) *Attorney, Agent, or Firm* — Holtz, Holtz & Volek PC

(57) ABSTRACT

Provided is a cooling device including: a fixing member including a holding part to hold a heat-generation member; a body; and a protrusion extending from the body; and an internal case configured to store the fixing member, the internal case having a hole at a position where the fixing member is disposed, through which the protrusion passes.

16 Claims, 8 Drawing Sheets

COOLING DEVICE AND PROJECTOR INCLUDING THE COOLING DEVICE

BACKGROUND OF THE INVENTION

1. Field of the Invention

The present invention relates to cooling devices and projectors including this cooling device.

2. Description of the Related Art

Currently data projectors are often used for an image projector to project images on a screen, and these images include an image on a screen of a personal computer, a video image, and images in accordance with image data stored in a memory card or the like. Such a projector is configured to collect light emitted from a light source to a micromirror display device called a digital micromirror device (DMD) or a liquid-crystal substrate and display a color image on a screen.

Along with the spread of a personal computer and video equipment such as a DVD player, a projector has been widely used for the presentation in a business scene as well as for home use. Such a projector typically has a high-intensity discharge lamp as a light source, but there are various types of projectors recently developed having, as a light source, a solid-state light-emitting device such as a laser diode or having such a solid-state light-emitting device and a fluorescent plate to be excited by the solid-state light emitting device. Since such a light source becomes a major heat source of the projector, a technique to cool the inside of the projector has been proposed.

For instance, a projector in JP-A-2015-52791 includes a semiconductor light-emitting device, a holder to hold the semiconductor light-emitting device, and a heat sink that is thermally connected to the holder. Heat of the semiconductor light-emitting device is transferred to fins of the heat sink. Cooling wind is supplied to the fins of the heat sink. Therefore heat generated from the semiconductor light-emitting device is released from the fins with the cooling wind.

In general a light source unit built in a projector as stated above desirably prevents the entering of dust that may interfere with light guided in the light source unit. To this end a light source or optical members in the light source unit are stored in a tightly-sealed case. When a member as a heat source stored in such a case is to be cooled, a case itself may have a heat-releasing function. The cooling, however, may not be enough.

A heat sink as in JP-A-2015-52791, which is connected to a member as a heat source, may be extended to the outside of the case. In such a case, an opening has to be bored at the case itself. This degrades the dust-proofness of the case. In this case, since heat is transferred via a plurality of members, the heat releasing is not effective.

In view of these points, the present invention aims to provide a light source unit and a projector capable of keeping the dust-proofness of a case and cooling the internal heat source effectively.

SUMMARY OF THE INVENTION

A cooling device of the present invention includes: a fixing member including a holding part to hold a heat-generation member; a body; and a protrusion extending from the body; and an internal case configured to store the fixing member, the internal case having a hole at a position where the fixing member is disposed, through which the protrusion passes.

A projector of the present invention includes: the cooling device; a display device; a light source side optical system configured to guide light passing through the cooling device toward the display device; and a projection lens unit configured to project an image emitted from the display device. The cooling device includes a light source unit.

DETAILED DESCRIPTION OF THE PREFERRED EMBODIMENT

Embodiment 1

Figure 1:
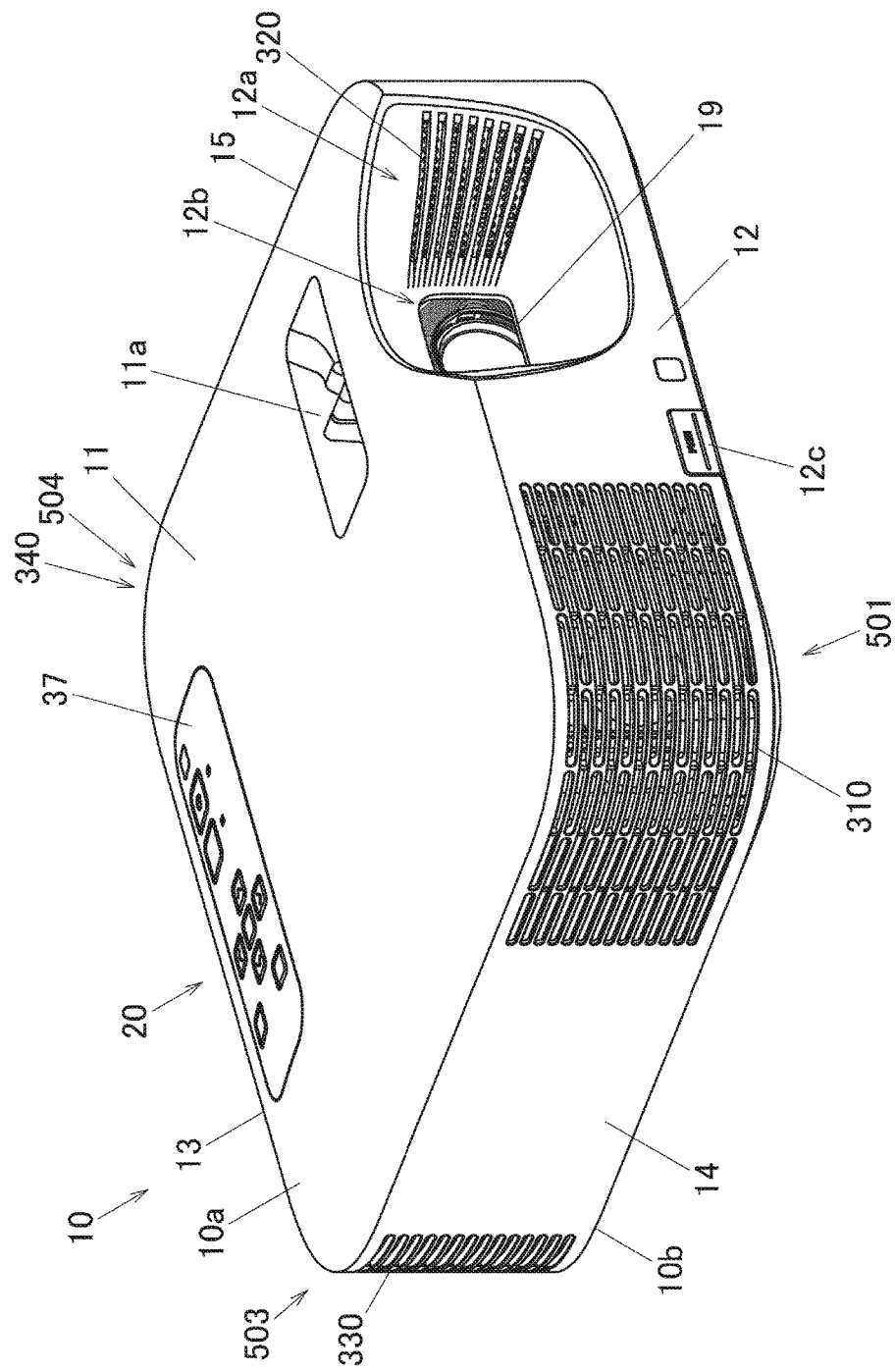
FIG. 1 is a perspective view showing the appearance of a projector according to Embodiment 1 of the present invention.

The following describes embodiments of the present invention. FIG. 1 is a perspective view showing the appearance of a projector 10. The projector 10 of the present embodiment includes an upper body case 10a and a lower body case 10b. A front panel 12, a rear panel 13, a right panel 14, and a left panel 15 are lateral plates of the chassis of the projector 10, and these panels are disposed vertically downward from the outer edge of the upper body case 10a. The lower ends of these panels 12 to 15 are in contact with the outer edge of the lower body case 10b. Therefore the projector 10 has a substantially cuboid shape defined by the upper body case 10a and the lower body case 10b. In the present embodiment, left and right of the projector 10 indicate the left and right directions relative to the projection direction, and back and forth of the projector 10 indicate the back and forth direction in the direction toward the screen or in the traveling direction of a light flux.

The chassis of the projector 10 has an upper panel 11, on which a keys/indicators unit 37 and a projected image adjusting unit 11a are disposed. In this keys/indicators unit 37, keys and indicators are disposed, which includes a power-supply switch, a power indicator showing ON or OFF of a power supply, a projection switch key to switch between ON and OFF of the projection, and an overheat indicator showing the overheat of a light source unit, a display device, a control circuit or the like, if any, for example. The projected image adjusting unit 11a includes one or a plurality of rotating knobs. The user can adjust the size and focus of a projected image by manipulating this rotating knob so as to adjust the position of a movable lens in a projection lens unit described later in FIG. 4. Although not illustrated, the projector 10 includes an Ir receiving part to receive a control signal from a remote controller.

A front right corner 501 between the front panel 12 and the right panel 14 has an air inlet 310. The front panel 12 has a light emission part 12a at a part on the left, which is a concave to have a circular cone shape. This light emission part 12a has an air inlet 320 on the inner wall at a part close to the left panel 15. The projector 10 has a projection slot 12b and a lens cover 19 covering the projection slot 12b at the light emission part 12a.

The front panel 12 has a height-adjusting button 12c disposed at the lower end. The projector 10 internally includes a supporting leg at a part close to the front panel 12. The user can adjust the supporting leg so as to extend from the below of the projector 10 or be embedded into the projector by pressing the height-adjusting button 12c. That is, the user manipulates the height-adjusting button 12c so that the supporting leg is fixed at any extended length, whereby the user can adjust the height and the tilt of the projector 10.

On the rear panel 13, various terminals 20 are disposed, which includes input/output connectors having a USB terminal, a D-SUB terminal, a S terminal, or a RCA terminal for inputting image signals, and a terminal for a power-supply adaptor plug. The rear panel 13 has an air outlet 330 at the corner with the right panel 14 as well as an air outlet 340 at the corner with the left panel 15.

Figure 2:
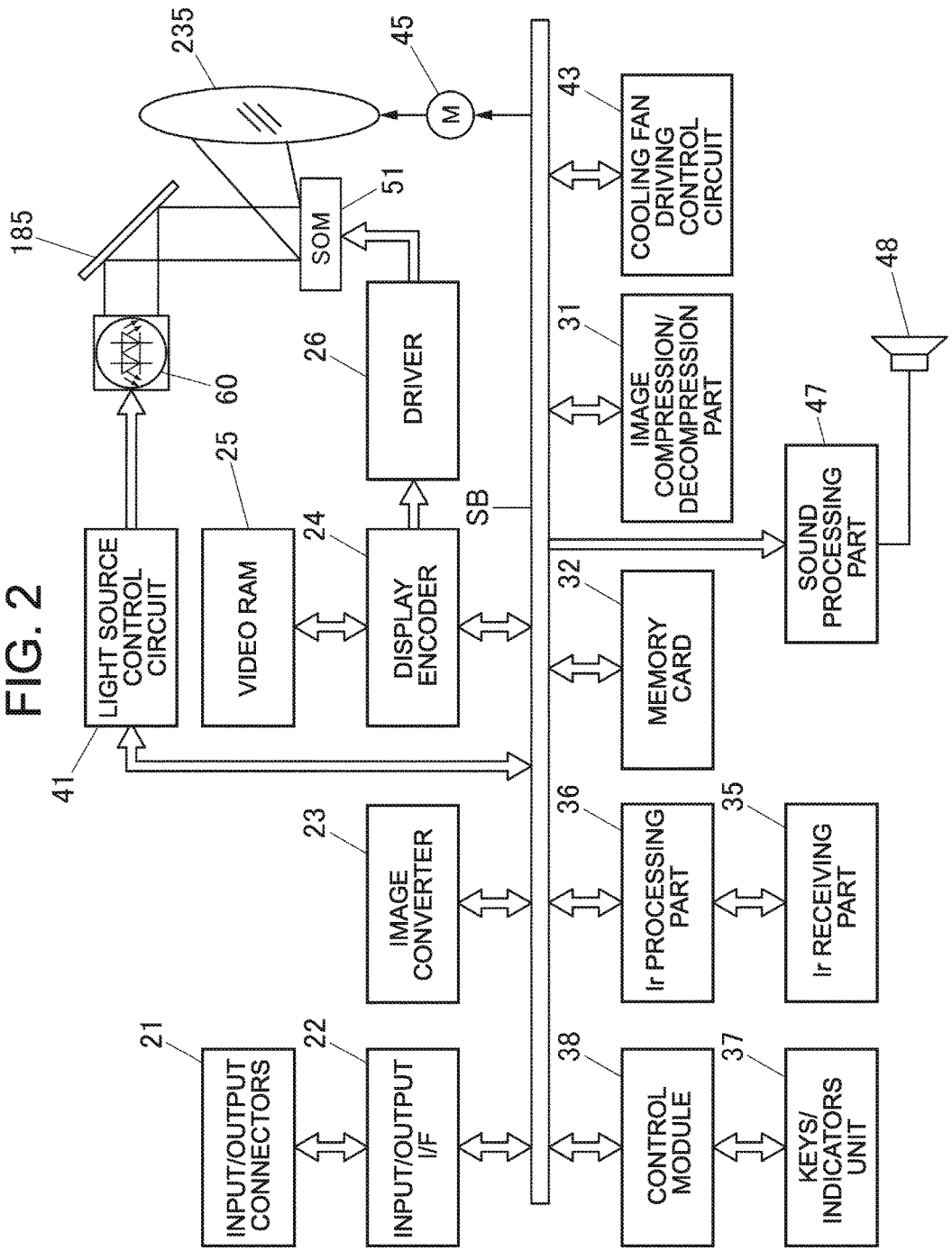
FIG. 2 is a functional block diagram of the projector according to Embodiment 1 of the present invention.

Next, a projector control unit of the projector 10 is described below with reference to a functional block diagram of FIG. 2. The projector control unit includes a control module 38, an input/output interface 22, an image converter 23, a display encoder 24 and a display driver 26.

The control module 38 controls the operation of various circuits in the projector 10, and includes a CPU, a ROM storing operation programs, such as various configurations, in a fixed manner, a RAM used as a work memory.

In this projector control unit, when image signals of different standards are input from the input/output connectors 21, the image converter 23 converts these image signals to image signals of a predetermined common format suitable for displaying and then are output to the display encoder 24 via the input/output interface 22 and a system bus (SB).

The display encoder 24 decompresses the input image signals and stores them in a video RAM 25. Then the display encoder 24 generates a video signal based on the contents stored in this video RAM 25 and outputs the video signal to the display driver 26.

The display driver 26 drives a display device 51 that is a spatial optical modulator (SOM) at an appropriate frame rate corresponding to an image signal output from the display encoder 24.

The projector 10 is configured to apply a light flux of the light emitted from a light source unit 60 as a light source to the display device 51 via a light-guiding optical system described later, so as to form an optical image (image) with the reflected light from the display device 51. The projector 10 is configured to project the formed optical image on a screen via a projection lens unit described later, so as to display an image on the screen. This projection lens unit includes a movable lens group 235, and the movable lens group is driven by a lens motor 45 for adjusting of zoom or focus.

An image compression/decompression part 31 compresses data as a brightness signal and a color-difference signal of an image signal by data processing, such as ADCT or Huffman coding, and records the data successively in a memory card 32 that is a removable recording medium.

In a reproduction mode, the image compression/decompression part 31 reads image data recorded in the memory card 32, and decompresses individual image data making up a series of moving images in the unit of one frame. The image compression/decompression part 31 outputs the image data to the display encoder 24 via the image converter 23, and then moving image or the like in accordance with the image data stored in the memory card 32 is displayed.

A manipulation signal from the keys/indicators unit 37 on the upper panel 11 of the chassis, including a main key and indicators, is directly sent to the control module 38. A key manipulation signal from a remote controller is received at an Ir receiving part 35, and a code signal demodulated at an Ir processing part 36 is output to the control module 38.

The control module 38 is connected to a sound processing part 47 via the system bus (SB). This sound processing part 47 includes a sound source circuit, such as a PCM sound source, and converts sound data into analog data in the projection mode and the reproduction mode. Then, the sound processing part drives a speaker 48 to amplify and emit the sound.

The control module 38 controls a light source control circuit 41 as a light source control unit. This light source control circuit 41 individually controls an exciting light irradiation unit in a green light source unit and light emission from a red light source unit of the light source unit 60 so that light at a predetermined wavelength band required for creation of images can be emitted from the light source unit 60. Light at a predetermined wavelength band emitted from the light source unit 60 is reflected from an irradiation mirror 185 and is applied to the display device 51.

The control module 38 controls a cooling fan driving control circuit 43 to detect the temperature using a plurality of temperature sensors disposed at the light source unit 60 or the like, so as to control the rotating speed of the cooling fan based on the result of the temperature detected. When receiving an instruction to turn OFF the power supply of the projector 10, the control module 38 can control the cooling fan driving control circuit 43 to keep the rotation of the cooling fan using a timer after the turning-OFF of the power supply of the projector 10, or controls to set a timing to turn OFF of the power supply of the projector 10 in accordance with the result of the temperature detected by the temperature sensors.

Figure 3:
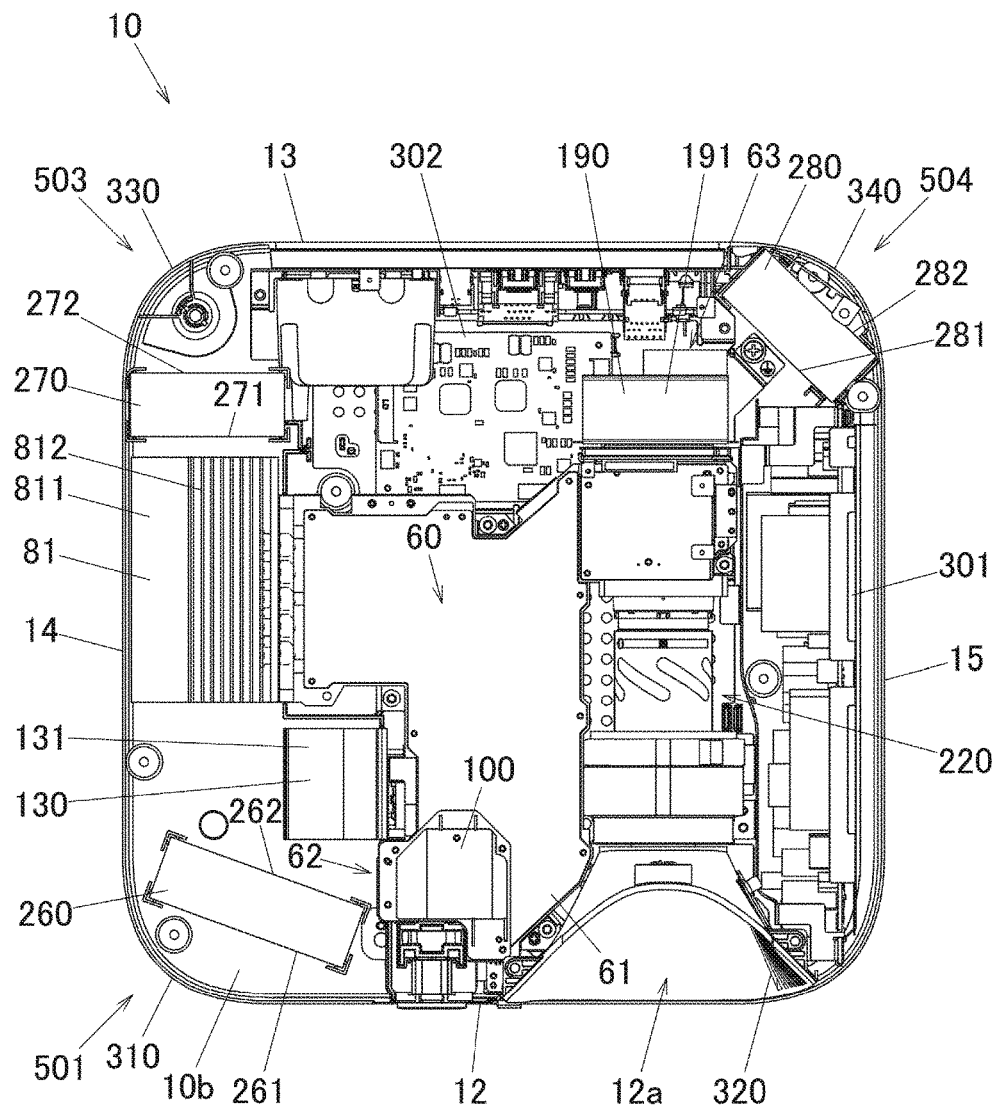
FIG. 3 is a schematic plan view showing the internal configuration of the projector according to Embodiment 1 of the present invention.

Next, the following describes the internal configuration of the projector 10. FIG. 3 is a schematic plan view showing the internal configuration of the projector 10. The projector 10 includes a power-supply part 301, a control circuit board 302, and the light source unit 60. The projector 10 includes an intake fan 260, an intermediate fan 270 and an exhaust fan 280 as the cooling fans.

The light source unit 60 is disposed at a substantially center of the chassis of the projector 10. The light source unit (cooling device) 60 internally stores optical members (heat-generating members), such as a light source, a lens, and a mirror in a light source case (internal case) 61. The heat-generating members are not limited to these optical members, which may include a CPU or the like. The power-supply part 301 is disposed closer to the left panel 15 than the light source unit 60 is. The board of the power-supply part 301 is disposed substantially parallel to the left panel 15. The control circuit board 302 is disposed closer to the rear panel 13 than the light source unit 60 is. The control circuit board 302 is disposed substantially perpendicular to the vertical direction. The control circuit board 302 includes a power-supply circuit block, a light source control block and the like. A plurality of the control circuit boards 302 may be disposed so as to correspond to the functions of the power-supply circuit block, the light source control block and the like.

Figure 4:
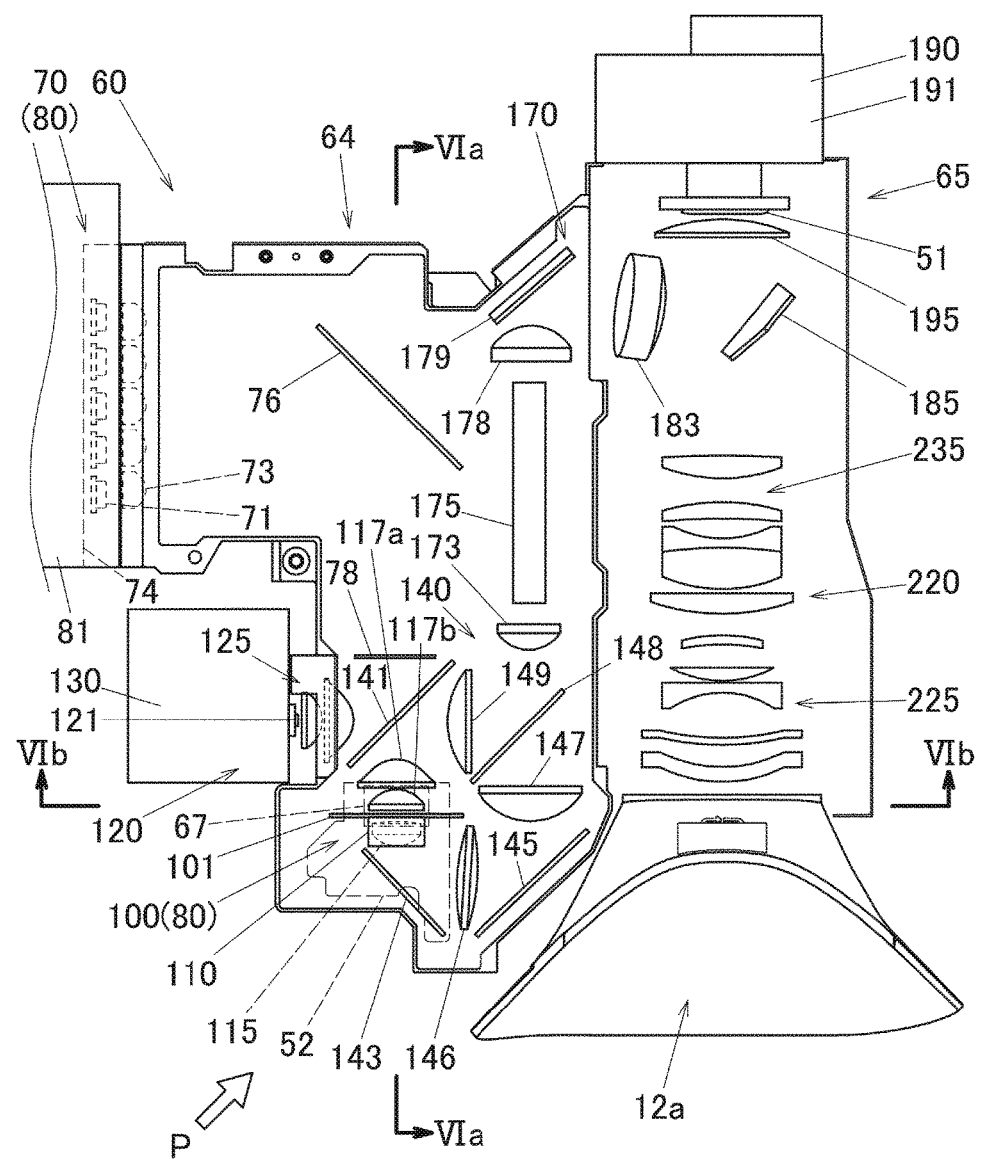
FIG. 4 is a schematic plan view of a light source unit according to Embodiment 1 of the present invention.

The following describes the internal configuration of the light source unit 60. FIG. 4 is a schematic plan view of the light source unit 60. The light source unit 60 includes a red light source unit 120 as a light source of light at a red wavelength band, a green light source unit 80 as a light source of light at a green wavelength band, and an exciting light irradiation device 70 that is a blue light source unit as a light source of light at a blue wavelength band as well as an exciting light source. The green light source unit 80 is made up of the exciting light irradiation device 70 and a fluorescent plate device 100. The light source unit 60 includes a light-guiding optical system 140. The light-guiding optical system 140 guides light fluxes of the green-wavelength band light, the blue-wavelength band light and the red-wavelength band light together to the same optical path.

The exciting light irradiation device 70 is disposed at a position close to the right panel 14 of the chassis of the projector 10. The exciting light irradiation device 70 includes a plurality of solid-state light-emitting devices disposed so that their optical axes are parallel to the rear panel 13. The solid-state light-emitting devices of the present embodiment are a plurality of blue laser diodes 71 that emit blue-wavelength band light. The plurality of blue laser diodes 71 are disposed parallel to the right panel 14. These blue laser diodes 71 are fixed to a fixing holder 74.

The exciting light irradiation device 70 includes a reflecting mirror 76, a diffuser plate 78, and a heat sink 81. The reflecting mirror 76 converts the optical axis of light emitted from each of the blue laser diodes 71 toward the diffuser plate 78 by about 90 degrees. The diffuser plate 78 diffuses the light emitted from each of the blue laser diodes 71 and reflected at the reflecting mirror 76 at a predetermined diffusion angle. As shown in FIG. 3, the heat sink 81 is disposed between the blue laser diodes 71 and the right panel 14. First fins 811 are disposed on the right of the heat sink 81, and their plate faces are perpendicular to the vertical direction. Second fins 812 are disposed above the heat sink, and their plate faces are perpendicular to the horizontal direction.

Referring back to FIG. 4, a collimator lens 73 is disposed on the optical path from each of the blue laser diodes 71 so as to increase the directivity of light emitted from the blue laser diode 71 and convert the light into parallel light. These collimator lenses 73 are fixed to the fixing holder 74 together with the blue laser diodes 71.

The red light source unit 120 includes a red light source 121 disposed so that its optical axis is parallel to the light flux of the blue laser diodes 71, and a collecting lens group 125 to collect light emitted from the red light source 121.

This red light source 121 includes a red light-emitting diode that is a solid-state light-emitting device emitting red-wavelength band light. The red light source unit 120 is disposed so that the optical axis of the red-wavelength band light emitted from the red light source unit 120 intersects with the optical axis of green-wavelength band light emitted from the fluorescent plate 101. The red light source unit 120 includes a heat sink 130 at a position closer to the right panel 14 than the red light source unit 121 is. The heat sink 130 has fins 131 that stand toward the right as a whole, and their plate faces are substantially perpendicular to the vertical direction. The fins 131 are disposed having a tilt so that they are widened radially in the vertical direction when viewed from the front.

The fluorescent plate device 100 making up the green light source unit 80 includes the fluorescent plate 101, a motor 110, collecting lenses 117a, 117b on the incident side, and a collecting lens 115 on the outgoing side. The motor 110 and the plurality of collecting lenses 117a, 117b and 115 (optical members) are held by a barrel (fixing member) 52. The fluorescent plate 101 is a fluorescent wheel that is disposed so as to be orthogonal to the optical axis of light emitted from the exciting light irradiation device 70. This fluorescent plate 101 is rotary driven by the motor 110. The collecting lenses 117a, 117b collect a light flux of exciting light emitted from the exciting light irradiation device 70 to the fluorescent plate 101. The collecting lens 115 collects a light flux emitted from the fluorescent plate 101 in the direction toward the front panel 12. The fluorescent plate device 100 is disposed above the collecting lenses 117a, 117b and 115. Therefore a lower part of the fluorescent plate 101 is disposed on the optical path of the collecting lenses 117a, 117b and 115.

The fluorescent plate 101 includes a fluorescent light emitting region and a diffusion/transmission region that are disposed side by side in the circumferential direction. The fluorescent light emitting region is a region to receive blue-wavelength band light emitted from the blue laser diodes 71 as exciting light and emit excited fluorescent light at a green wavelength band. The diffusion/transmission region diffuses and transmits light emitted from the blue laser diodes 71. The emitted light that is diffused and transmitted is emitted as blue-wavelength band light of the light source unit 60.

The light-guiding optical system 140 includes a first dichroic mirror 141, a collecting lens 149, a second dichroic mirror 148, a first reflecting mirror 143, a collecting lens 146, a second reflecting mirror 145, and a collecting lens 147. The first dichroic mirror 141 is disposed at a position where blue wavelength-band light emitted from the exciting light irradiation device 70, green wavelength-band light emitted from the fluorescent plate 101 and red wavelength-band light emitted from the red light source unit 120 intersect. The first dichroic mirror 141 transmits blue wavelength-band light and red wavelength-band light, and reflects green wavelength-band light. The optical axis of the green wavelength-band light reflected from the first dichroic mirror 141 is converted by 90 degrees so as to be directed toward the collecting lens 149 in the direction of the left panel 15. Therefore the optical axis of the red wavelength-band light passing through the first dichroic mirror 141 coincides with the optical axis of the green wavelength-band light reflected from the first dichroic mirror 141.

The collecting lens 149 is disposed closer to the left panel 15 than the first dichroic mirror 141 is. The red wavelength-band light passing through the first dichroic mirror 141 and the green wavelength-band light reflected from the first dichroic mirror 141 both are incident on the collecting lens 149. The second dichroic mirror 148 is disposed closer to the left panel 15 than the collecting lens 149 is, and is disposed closer to the rear panel 13 than the collecting lens 147 is. The second dichroic mirror 148 reflects red wavelength-band light and green wavelength-band light, and transmits blue wavelength-band light. Therefore the red wavelength-band light and the green wavelength-band light collected by the collecting lens 149 are reflected from the second dichroic mirror 148, and are converted toward the rear panel 13 by 90 degrees. A collecting lens 173 is disposed closer to the rear panel 13 than the second dichroic mirror 148 is. The red wavelength-band light and the green wavelength-band light reflected from the second dichroic mirror 148 are incident on the collecting lens 173.

The first reflecting mirror 143 is disposed on the optical axis of the blue wavelength-band light passing through the fluorescent plate 101, i.e., between the collecting lens 115 and the front panel 12. The first reflecting mirror 143 reflects blue wavelength-band light, and converts the optical axis of this blue wavelength-band light by 90 degrees in the direction of the left panel 15. The collecting lens 146 is disposed closer to the left panel 15 than the first reflecting mirror 143 is. The second reflecting mirror 145 is disposed closer to the left panel 15 than the collecting lens 146 is. The second reflecting mirror 145 converts the optical axis of the blue wavelength-band light reflected from the first reflecting mirror 143 and collected by the collecting lens 146 by 90 degrees toward the rear panel 13. The collecting lens 147 is disposed closer to the rear panel 13 than the second reflecting mirror 145 is. The blue wavelength-band light reflected from the second reflecting mirror 145 transmits the second dichroic mirror 148 via the collecting lens 147, and is incident on the collecting lens 173. In this way, the light fluxes of the red, green and blue wavelength-band light guided by the light-guiding optical system 140 are guided on the same optical path of a light source side optical system 170.

The light source side optical system 170 includes the collecting lens 173, a light-guiding device 175 such as a light tunnel and a glass rod, a collecting lens 178, an optical-axis conversion mirror 179, a collecting lens 183, an irradiation mirror 185, and a condenser lens 195. The condenser lens 195 is also a part of the projection lens unit 220 because this lens emits image light emitted from the display device 51 disposed closer to the rear panel 13 than the condenser lens 195 is toward the projection lens unit 220.

Light fluxes emitted from the collecting lens 173 are incident on the light-guiding device 175. Light fluxes incident on the light-guiding device 175 become a light flux having a more uniform intensity distribution by the light-guiding device 175.

On the optical axis of the light-guiding device 175 close to the rear panel 13, the optical-axis conversion mirror 179 is disposed via the collecting lens 178. A light flux emitted from the aperture of the light-guiding device 175 is collected by the collecting lens 178, and then is converted into the optical axis directed toward the collecting lens 183 by the optical-axis conversion mirror 179.

The light flux reflected from the optical-axis conversion mirror 179 is collected by the collecting lens 183, and then is applied at a predetermined angle to the display device 51 via the condenser lens 195 by the irradiation mirror 185. A heat sink 190 is disposed closer to the rear panel 13 than the display device 51 is. The display device 51 as a DMD is cooled by this heat sink 190. Fins 191 are disposed behind the heat sink 190, and their plate faces are perpendicular to the vertical direction.

A light flux as light from the light source applied to the image-formation surface of the display device 51 by the light source side optical system 170 is reflected from the image-formation surface of the display device 51, and is projected as projection light on the screen via the projection lens unit 220.

The projection lens unit 220 includes the condenser lens 195, the movable lens group 235 and a fixed lens group 225. The fixed lens group 225 is built in a fixed lens barrel. The movable lens group 235 is built in a movable lens barrel, and is moved manually or automatically so as to enable zoom adjustment or focus adjustment.

With such a configuration of the projector 10, when the fluorescent plate 101 is rotated while emitting light from the exciting light irradiation device 70 and the red light source unit 120 at different timings, light at red, green and blue wavelength bands is incident on the light-guiding device 175 via the light-guiding optical system 140, and then is incident on the display device 51 via the light source side optical system 170. As a result, the DMD as the display device 51 of the projector 10 displays light in different colors in a time-dividing manner in accordance with data, whereby a color image can be projected on the screen.

Referring back to FIG. 3, the intake fan 260 is disposed at the front right corner 501 and inside of the air inlet 310. The intake fan 260 has an inlet side 261 facing the air inlet 310 and an outlet side 262 directed to a substantially center of the projector 10, and is disposed obliquely. The intermediate fan 270 is disposed at the rear right corner 503 and behind the heat sink 81. The intermediate fan 270 has an inlet side 271 facing the heat sink 81 and an outlet side 272 facing the air outlet 330. The exhaust fan 280 is disposed at the rear left corner 504 and inside of the air outlet 340.

The exhaust fan 280 has an inlet side 281 facing the heat sink 190 and an outlet side 282 facing the air outlet 340, and is disposed obliquely. In this way, the intake fan 260 and the exhaust fan 280 are disposed at diagonal positions in the body cases 10*a* and 10*b*. Each of the intake fan 260, the intermediate fan 270 and the exhaust fan 280 of the present embodiment includes one axial-flow type fan. The intake fan 260, the intermediate fan 270 and the exhaust fan 280 have their heights extending from the lower body case 10*b* close to the upper body case 10*a*. In this way, the intake fan 260, the light source case 61 and the body cases 10*a* and 10*b* make up the cooling configuration of the light source unit.

In the present embodiment, the heat sink 130 of the red light source 121, the heat sink 81 of the blue laser diodes 71, and the fluorescent plate device 100, which generate relatively large amount of heat, are disposed close to the intake fan 260.

Figure 5:
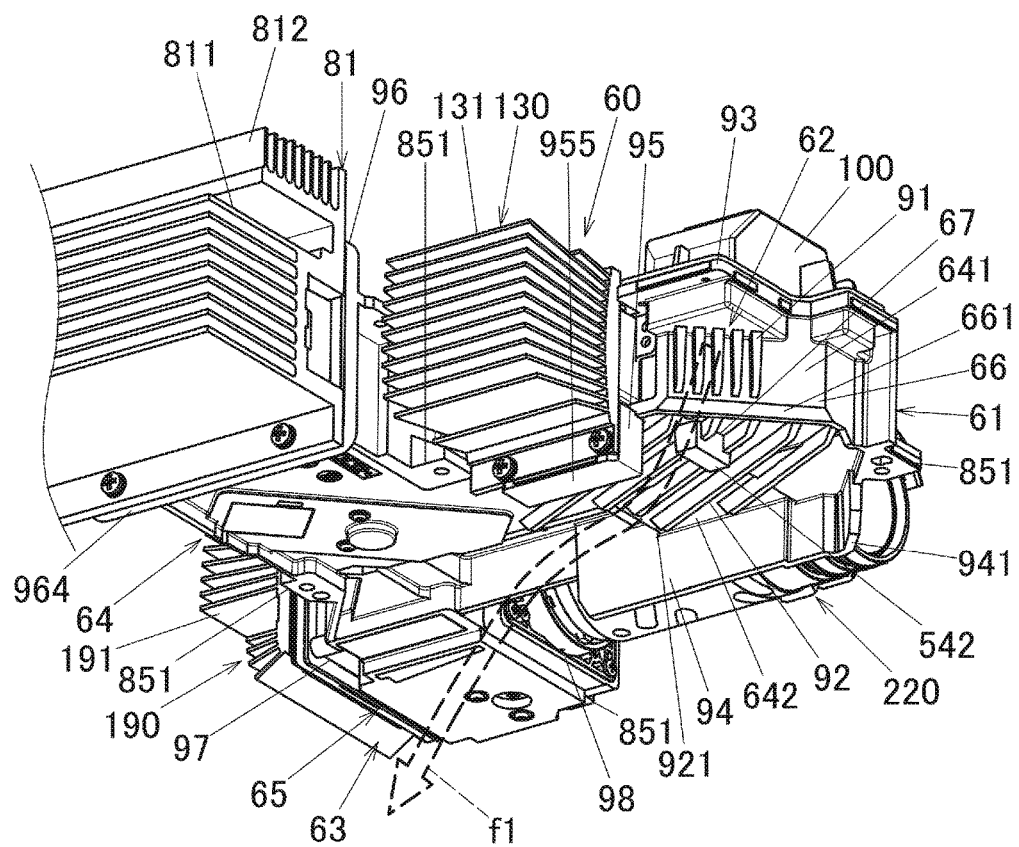
FIG. 5 is a perspective view of a light source case according to Embodiment 1 of the present invention viewed from the rear face.

FIG. 5 is a perspective view of the rear face of the light source case 61 viewed from the front right position P in FIG. 4. The light source case 61 has a first block 64 and a second block 65. The first block 64 is to store the light source unit 60 and the light-guiding optical system 140 shown in FIG. 4. The first block 64 is to store the collecting lenses 173, 178, the light-guiding device 175 and the optical-axis conversion mirror 179 of the light source side optical system 170 shown in FIG. 4. The light source unit 60 is a heat source in the projector 10.

In the first block 64, a fluorescent plate device fixing part 93 is disposed above the lateral face 641 on the side of the inflow part 62. The fluorescent plate device fixing part 93 has a plate shape having the plate face directed vertically.

The fluorescent plate device fixing part 93 has a plurality of fixing holes as a fixing part of the fluorescent plate device 100.

The first block 64 has a plurality of lateral ribs 91 on the lateral face 641 on the side of the inflow part 62. Each of the lateral ribs 91 has a plate shape that stands perpendicularly from the lateral face 641. Each of the lateral ribs 91 extends downward from the fluorescent plate device fixing part 93. These lateral ribs 91 have a substantially same length.

The first block 64 has a plurality of lower ribs 92 on the bottom face 642 at a front position where the light-guiding optical system 140 is to be disposed. Each of the lower ribs 92 has a plate shape that stands downward from the bottom face 642. Each of the lower ribs 92 has a substantially isosceles trapezoidal shape in a lateral view from the direction of the plate face. That is, each end of the lower rib 92 has an inclined face 921. The lower ribs 92 extend obliquely from the inflow part 62 toward the outflow part 63 of the second block 65. The rear end of the lower rib 92 is located at a substantially center in the back and forth direction of the light source case 61. Five of the horizontal ribs 91 and five of the lower ribs 92 are disposed in the present embodiment.

At the corner between the lateral face 641 having the lateral ribs 91 and the bottom face 642 having the lower ribs 92, a rim plate 66 extends downward from the lateral face 641. The rim plate 66 has a chamferred part 661 on the side of the lateral face 641 of the light source case 61. The chamferred part 661 is inclined to have a flat shape from the lateral face 641 to the bottom face 642. The inclined face 921 of each lower rib 92 close to the lateral face 641 is connected to the rim plate 66.

Figure 6A:
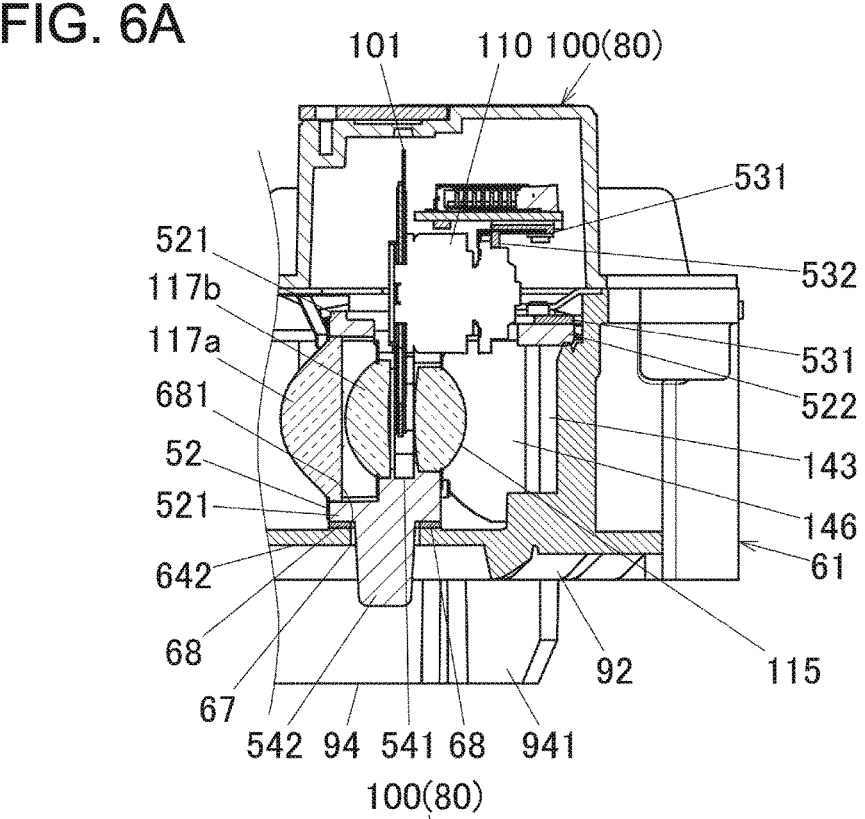
FIG. 6A is a cross-sectional view of a part around a barrel in FIG. 4 according to Embodiment 1 of the present invention taken along the line VIa-VIa.
Figure 6B:
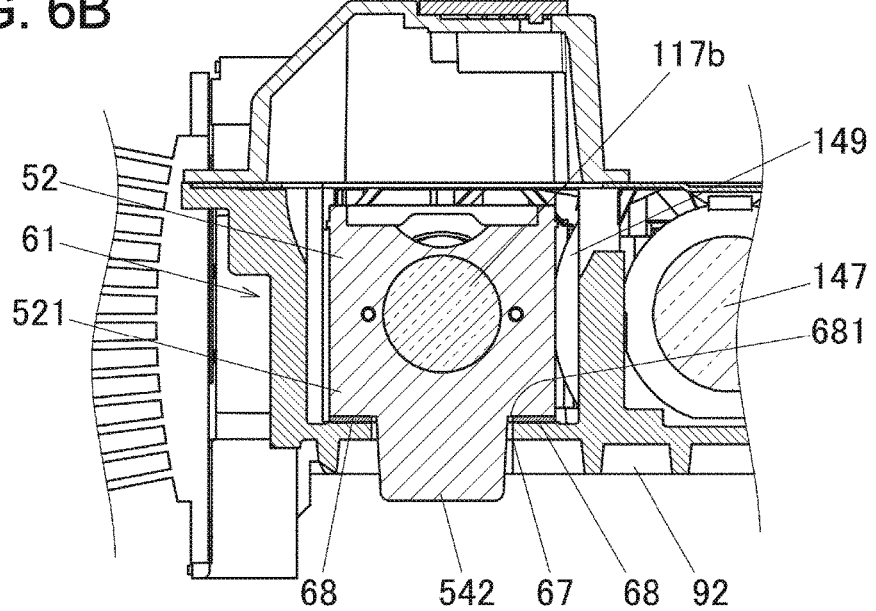
FIG. 6B is a cross-sectional view of a part around the barrel in FIG. 4 according to Embodiment 1 of the present invention taken along the line VIb-VIb.

The bottom face 642 having the lower ribs 92 has a substantially rectangular hole 67. The hole 67 is disposed below the position where a barrel 52 described later in FIGS. 6A and 6B is to be disposed. The barrel 52 has a protrusion 542 at a part thereof, and this protrusion is inserted into the hole 67 so as to be exposed to the outside. The protrusion 542 has a lower end that is below the lower end of the lower ribs 92 disposed on the bottom face 642.

In the first block 64, a guide wall 94 is disposed so as to be opposed to the inflow part 62 and at the left edge. The guide wall 94 stands downward from the bottom face 642. The guide wall 94 extends from the front to the rear close to a substantially center in the back and forth direction of the light source case 61. In front of the guide wall 94, a front guide part 941 is disposed so as to extend to the front right in the plan view. The guide wall 94 has a lower end that is below the lower ribs 92 and the protrusion 542.

The first block 64 has a red light source unit fixing part 95 on the right opposed to the guide wall 94. The red light source unit fixing part 95 is to fix the members of the red light source unit 120 shown in FIG. 4. At the red light source unit fixing part 95, the collecting lens group 125 and the red light source 121 are disposed.

In the first block 64, a blue light source unit fixing part 96 is disposed on the right of the light source case 61 and behind the red light source unit fixing part 95. The blue light source unit fixing part 96 is to fix the members of the exciting light irradiation device 70. At the blue light source unit fixing part 96, the fixing holder 74 and the blue laser diodes 71 are disposed.

The second block 65 is disposed on the left of and behind the first block 64, and has a substantially cubic shape. The second 65 is to store the collecting lens 183, the irradiation mirror 185, the condenser lens 195, the display device 51 and the like of the light source side optical system 170 shown in FIG. 4. A display device fixing part 97 is disposed at a rear part of the second block 65 to fix the display device 51 and the heat sink 190. The display device 51 and the heat sink 190 are a heat source in the projector 10, which are disposed on the side of the outflow part 63. A barrel fixing part 98 is disposed at a front part of the second block 65 to fix a lens barrel of the projection lens unit 220.

The light source case 61 has a plurality of fixing parts 851. These plurality of fixing parts 851 come in contact with a supporting part not illustrated that stands upward from the inner face of the lower body case 10b so as to support the light source case 61 from the below. That is, the lower face of the light source case 61 is disposed to keep a gap from the inner face of the bottom part of the lower body case 10b. This gap is formed at least from the inflow part 62 to the outflow part 63. In this way, the gap formed between the light source case 61 and the lower body case 10b defines an air-flow path through which air fl flows from the inflow part 62 to the outflow part 63. The lateral ribs 91, the lower ribs 92 and the protrusion 542 as stated above are therefore disposed along the air-flow path on the outer faces of the light source case 61.

FIG. 6A is a cross-sectional view of a part around the barrel 52 in FIG. 4 taken along the line VIa-VIa viewed from the right to the left. FIG. 6B is a cross-sectional view of a part around the barrel 52 in FIG. 4 taken along the line VIb-VIb viewed from the front to the rear. The barrel 52 is stored in the light source case 61. The barrel (fixing member) 52 is to fix the motor 110 to rotary-drive the fluorescent plate 101 and the plurality of collecting lenses 117a, 117b and 115 disposed in front of and behind the fluorescent plate 101 shown in FIG. 3.

The barrel 52 includes a body 521, an upper plate 522 and a holding part. The body 521 has a substantially cuboid shape. The upper plate 522 extends from the upper end of the body 521 toward the collecting lens 115 so that its plate face is directed vertically. At the upper face of the upper plate 522, a motor fixing plate 531 is disposed. The motor fixing plate 531 has a bending shape to have an opening so as to be opposed to the motor 110. The motor 110 is fixed to a vertical part 532 of the motor fixing plate 531. The holding part is to hold optical members (heat-generating members) such as the plurality of collecting lenses 117a, 117b and 115.

The body 521 has one side, to which two of the collecting lenses 117a and 117b are fixed. The body 521 has the other side, to which the collecting lens 115 is fixed. The barrel 52 has a groove 541, into which a part of the fluorescent plate 101 is inserted. The groove 541 is disposed between the collecting lens 117b and the collecting lens 115.

At a lower part of the barrel 52, its protrusion 542 extends from the lower part of the body 521. The protrusion 542 of the present embodiment stands to have a substantially quadrangular prism shape having a substantially same laterally cross-sectional shape as the shape of the hole 67.

A sealing member 68, such as packing, is disposed between the barrel 52 and the bottom part of the light source case 61. The sealing member 68 has an opening 681, into which the protrusion 542 is to be inserted. The barrel 52 is in contact with the bottom part of the light source case 61 as the edge of the hole 67 at the face via the sealing member 68, so as to interrupt the space between the inside and the outside of the light source case 61. Therefore the light source case 61 can avoid deterioration in air-tightness due to the hole 67, and so can have improved dust-proofness.

In this way the present embodiment includes the protrusion 542 on the way of the air-flow path. The guide wall 94 functions to guide air fl from the inflow part 62 to the outflow part 63. A part of the lower ends 964, 955 of the blue light source unit fixing part 96 and the red light source unit fixing part 95 also functions to guide air fl from the inflow part 62 to the outflow part 63. Therefore dust-proofness in the light source case 61 can be kept, and stored members such as the motor 110, the fluorescent plate 101, and the collecting lenses 117*a*, 117*b*, and 115 that are thermally connected to the light source case 61 and the protrusion 542 can be cooled effectively.

In the present embodiment, the protrusion 542 has a pillar shape (solid shape), whereby heat of the barrel 52 can be easily moved toward the air-flow path.

Although the sealing member 68 is disposed between the barrel 52 and the bottom part of the light source case 61, the sealing member 68 can be omitted. In this case also, while the light source and optical members in the light source unit 60 are stored in the tightly-sealed light source case 61, dust-proofness of the light source case 61 can be kept and the internal heat source can be cooled effectively.

Embodiment 2

Figure 7:
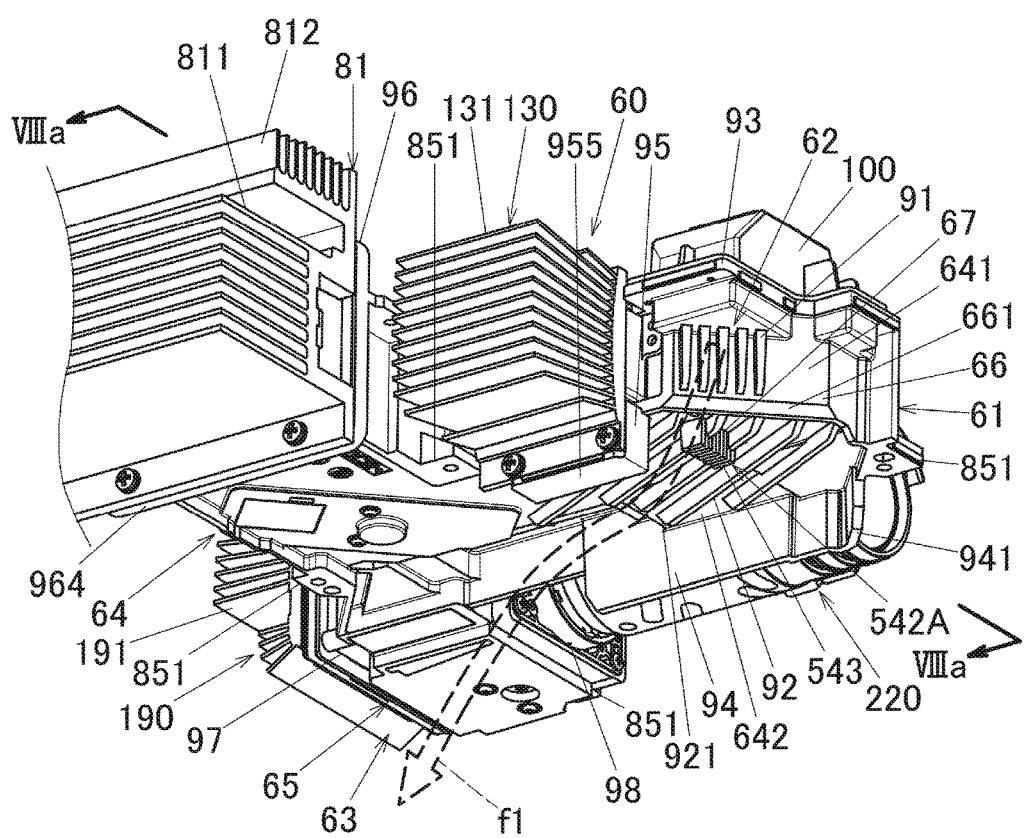
FIG. 7 is a perspective view of a light source case according to Embodiment 2 of the present invention viewed from the rear face.
Figure 8A:
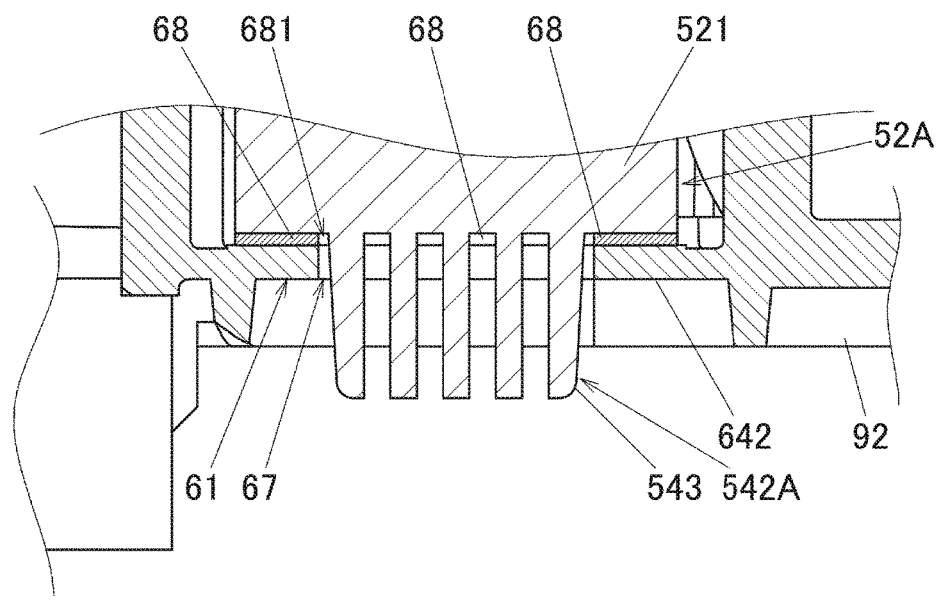
FIG. 8A is a cross-sectional view of a part around a barrel in FIG. 7 according to Embodiment 2 of the present invention taken along the line VIIIa-VIIIa, in which a seal member is disposed along all of the fins.

The following describes Embodiment 2 of the present invention. FIG. 7 is a perspective view of the rear face of a light source case 61 of Embodiment 2. FIG. 8A is a cross-sectional view of a part around a barrel 52A of the light source case 61 in FIG. 7 taken along the line VIIIa-VIIIa. The present embodiment includes the barrel 52A instead of the barrel 52. The barrel 52A has a plurality of fins 543 as a protrusion 542A. The fins 543 are exposed to the outside from a hole 67. In the description of the present embodiment, like numbers indicate like components as in Embodiment 1 to omit or simplify their descriptions.

A sealing member 68 is disposed between the barrel 52A and the bottom part of a light source case 61. The sealing member 68 has an opening 681, into which the fins 543 are to be inserted. FIG. 8A shows the example of the sealing member 68 disposed along the outer periphery of the fins 543 as a whole, and the plurality of fins 543 is collectively exposed to the outside from the one opening 681 and hole 67.

In this way, the light source case 61 can avoid deterioration in air-tightness due to the hole 67, and can improve heat dissipation.

Figure 8B:
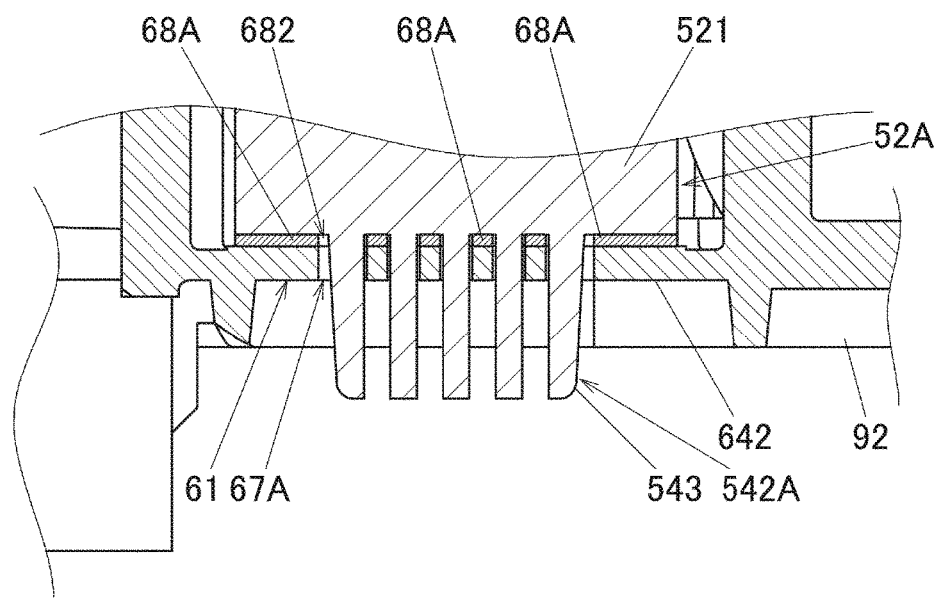
FIG. 8B is a cross-sectional view of a part around the barrel in FIG. 7 according to Embodiment 2 of the present invention taken along the line VIIIa-VIIIa that is a modified example, in which a seal member is disposed for each of the fins.

The following describes a modified example of the opening 681 and the hole 67. FIG. 8B is a cross-sectional view of a part around a barrel 52A in the light source case 61. This drawing is a cross-sectional view at a position corresponding to the VIIIa-VIIIa cross-sectional view in FIG. 7. The light source case 61 has a plurality of slit-like holes 67A that are long along the direction of the plate face of the fins 543. A sealing member 68A disposed between the barrel 52A and the bottom face 642 of the light source case 61 has a plurality of slit-like openings 682. The openings 682 of the sealing member 68A and the holes 67A at the bottom face 642 are disposed corresponding to the fins 543. Each fin 543 is inserted into the corresponding hole 67A and the bottom face 642 to be exposed to the outside of the light source case 61.

This can further improve air-tightness of the light source case 61, and can improve heat dissipation from the barrels 52 and 52A.

The sealing member 68, 68A shown in these embodiments can be made of a heat-insulating material having good heat insulating properties. Therefore even when the light source case 61 is higher in temperature than the barrel 52, 52A due to heat generated from the members in the light source case 61, transferring of the heat to the barrel 52, 52A can be prevented, and optical members fixed to the barrel 52, 52A can be cooled effectively.

The sealing member 68, 68A may be made of a material having good heat conductivity. Therefore even when the barrel 52, 52A is higher in temperature than the light source case 61 due to heat generated from the optical members fixed to the barrel 52, 52A, optical members fixed to the barrel 52, 52A can be cooled effectively via the protrusion 542 and the light source case 61.

The hole 67 at the bottom part of the light source case 61 allows the barrel 52, 52A storing the fluorescent plate 101, the motor 110 and the plurality of collecting lenses 117*a*, 117*b*, and 115 as a heat source to be exposed to the outside air directly, and so the cooling efficiency can be increased.

The protrusion 542 may be configured having a pillar shaped proximal end part in combination with fins 543 at a distal end part.

In this way, the light source unit 60 and the projector 10 of the present embodiment include the light source case 61 storing the fixing member (barrel 52, 52A) to fix optical members. The light source case 61 has the hole 67, 67A at the position of the fixing member so as to allow the protrusion 542, 542A extending from the body 521 of the fixing member to be exposed to the outside. Therefore the light source unit 60 and the projector 10 can keep dust-proofness of the light source case 61 and can cool separate members stored in the case effectively.

The light source unit 60 includes the motor 110 to rotary-drive the fluorescent plate 101 and a plurality of collecting lenses 117*a*, 117*b* and 115 disposed on one side and on the other side of the fluorescent plate 101, and such a light source unit can easily cool a plurality of held members to be cooled in a concentrated manner.

The light source unit 60 has a plurality of fins 543 collectively exposed to the outside from the opening 681 and the hole 67, and so the configuration of the hole 67 can be simplified, and the barrel 52A having high heat-dissipation property can be formed.

The above embodiments are just for illustration of the present invention, are not intended to limit the present invention to them. These novel embodiments can be embodied in other various forms, and various omissions, replacement and modifications can be added without deviating from the gist of the invention. These embodiments and their modifications are covered by the scope of the invention and its gist, and are covered by the scope of the invention recited in the following claims and their equivalents.

What is claimed is:

1. A cooling device comprising:
   a fixing member including a holding part to hold a heat-generation member, a body, and a protrusion extending from the body;
   an internal case configured to store the fixing member, the internal case having a hole at a position where the fixing member is disposed, wherein the protrusion of the fixing member passes through the hole; and
   a sealing member disposed between the fixing member and the internal case, the sealing member having an opening through which the protrusion passes.

2. The cooling device according to claim 1, wherein the heat-generation member is an optical member, and the internal case is a light source case.

3. The cooling device according to claim 2, further comprising a motor to rotary-drive a fluorescent plate having a first face and a second face, and lenses disposed facing the first face and the second face of the fluorescent plate.

4. The cooling device according to claim 1, wherein the protrusion has a pillar shape.

5. The cooling device according to claim 2, wherein the protrusion has a pillar shape.

6. The cooling device according to claim 3, wherein the protrusion has a pillar shape.

7. The cooling device according to claim 1, wherein the protrusion comprises a plurality of fins.

8. The cooling device according to claim 2, wherein the protrusion comprises a plurality of fins.

9. The cooling device according to claim 3, wherein the protrusion comprises a plurality of fins.

10. The cooling device according to claim 7, wherein the plurality of fins pass through the opening.

11. The cooling device according to claim 10, wherein the internal case has a plurality of the holes, the sealing member has a plurality of the openings, and each of the plurality of fins is exposed to outside of the internal case via a corresponding one of the openings and a corresponding one of the holes.

12. The cooling device according to claim 10, wherein the plurality of fins are collectively exposed to outside of the internal case via the opening and the hole.

13. The cooling device according to claim 1, wherein the sealing member comprises a heat-insulating material.

14. A projector comprising:
the cooling device according to claim 1;
a display device;
a light source side optical system configured to guide light passing through the cooling device toward the display device; and
a projection lens unit configured to project an image emitted from the display device,
wherein the cooling device comprises a light source unit.

15. A cooling device comprising:
a fixing member including a holding part to hold a heat-generation member, a body, and a plurality of fins extending from the body;
an internal case configured to store the fixing member, the internal case having a hole at a position where the fixing member is disposed, wherein the plurality of fins of the fixing member pass through the hole; and
a sealing member disposed between the fixing member and the internal case, the sealing member having an opening through which the plurality of fins pass.

16. A cooling device comprising:
a fixing member including a holding part to hold a heat-generation member, a body, and a protrusion extending from the body, the holding part, the body, and the protrusion being integrally formed; and
an internal case configured to store the fixing member, the internal case having a hole at a position where the fixing member is disposed, wherein the protrusion of the fixing member passes through the hole,
wherein the protrusion of the fixing member protrudes from the internal case.

* * * * *